US008713703B2

(12) United States Patent
Fisk et al.

(10) Patent No.: US 8,713,703 B2
(45) Date of Patent: Apr. 29, 2014

(54) ADVANCED CAPTCHA USING IMAGES IN SEQUENCE

(75) Inventors: Frank Clay Fisk, Lawrenceville, GA (US); Sri Ramanathan, Lutz, FL (US); Matthew Adam Terry, Dunwoody, GA (US); Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/194,971

(22) Filed: Jul. 31, 2011

(65) Prior Publication Data

US 2013/0031640 A1    Jan. 31, 2013

(51) Int. Cl.
*G06F 12/14* (2006.01)
*G06F 21/36* (2013.01)
*H04L 29/06* (2006.01)

(52) U.S. Cl.
CPC ............ *G06F 21/36* (2013.01); *H04L 63/08* (2013.01); *H04L 63/1441* (2013.01)
USPC .............. 726/28; 726/2; 726/22; 726/27

(58) Field of Classification Search
None
See application file for complete search history.

(56) References Cited

U.S. PATENT DOCUMENTS

| 6,332,192 | B1 | 12/2001 | Boroditsky et al. | |
|---|---|---|---|---|
| 8,112,483 | B1 * | 2/2012 | Emigh et al. | 709/206 |
| 2003/0035585 | A1 * | 2/2003 | Osborne et al. | 382/232 |
| 2004/0254793 | A1 * | 12/2004 | Herley et al. | 704/270 |
| 2007/0143624 | A1 | 6/2007 | Steeves | |
| 2007/0201745 | A1 | 8/2007 | Wang et al. | |
| 2007/0266428 | A1 * | 11/2007 | Downes et al. | 726/5 |
| 2008/0066014 | A1 | 3/2008 | Misra | |
| 2008/0127302 | A1 | 5/2008 | Qvarfordt et al. | |
| 2008/0244700 | A1 | 10/2008 | Osborn et al. | |
| 2009/0113294 | A1 | 4/2009 | Sanghavi et al. | |
| 2009/0235327 | A1 | 9/2009 | Chow et al. | |
| 2009/0328150 | A1 | 12/2009 | Gross | |
| 2010/0095350 | A1 * | 4/2010 | Lazar et al. | 726/3 |
| 2010/0229223 | A1 * | 9/2010 | Shepard et al. | 726/5 |
| 2010/0306055 | A1 * | 12/2010 | Kolb | 705/14.55 |
| 2011/0029781 | A1 * | 2/2011 | Clark et al. | 713/182 |

(Continued)

FOREIGN PATENT DOCUMENTS

CN    1271432 A    10/2000

OTHER PUBLICATIONS

Jain, Abhimanyu; Jain, Ashish; Raj, A.; Pahwa, T., "Sequenced picture captcha: generation and its strength analysis," Internet Technology and Secured Transactions, 2009. ICITST 2009. International Conference for , vol., No., pp. 1,8, Nov. 9-12, 2009.*

(Continued)

*Primary Examiner* — Matthew Henning
(74) *Attorney, Agent, or Firm* — Jason H. Sosa

(57) ABSTRACT

A CAPTCHA challenge tool for determining if a user of a computer is a human or an automated program. The tool presents a set of images. At least a portion of the set of images suggests a chronological sequence when organized correctly. The tool receives a suggested order from the user of the computer. If the suggested order matches the correct order, the tool assumes that the user is a human, if the suggested order does not match the correct order, the tool assumes the user is an automated program.

18 Claims, 6 Drawing Sheets

(56) References Cited

U.S. PATENT DOCUMENTS

| | | | |
|---|---|---|---|
| 2011/0029902 A1* | 2/2011 | Bailey | 715/764 |
| 2011/0150267 A1 | 6/2011 | Fritz et al. | |
| 2011/0314529 A1* | 12/2011 | Bailey, Jr. | 726/7 |
| 2012/0232907 A1* | 9/2012 | Ivey | 704/273 |

OTHER PUBLICATIONS

Raj A, Jain A, Pahwa T and Jain Ab. "Picture CAPTCHA's With Sequencing: Their Types and Analysis", IJDS, vol. 1, Issue 3, pp. 208-220, (2010).*

U.S. Appl. No. 13/194,974, entitled "Advanced Audio CAPTCHA," filed Jul. 31, 2011.

International Search Report and Written Opinion dated Jan. 17, 2013 from corresponding PCT Application No. PCT/IB2012/053884.

Desai et al. "Drag and Drop: A Better Approach to CAPTCHA." Annual India IEEE Conference, 2009, pp. 1-4, Dec. 18-20, 2009. IEEE Press New York.

Shah et al. "Drag and Drop Image CAPTCHA." Proceedings of 4th J&K Science Congress. vol. 8, Article 46 (2008), Nov. 12-14, 2008, University of Kashmir, Srinagar, India.

Gao et al. "A Novel Image Based CAPTCHA Using Jigsaw Puzzle." Computational Science and Engineering (CSE), 2010 IEEE 13th International Conference on Computational Science and Engineering, pp. 351-356, Dec. 11-13, 2010. IEEE.

Nucleus Research. "Nucleus Research: Spam Costing US Businesses $712 Per Employee Each Year." Apr. 2, 2007. <http://nucleusresearch.com/news/press-releases/nucleus-research-spam-costing-us-businesses-712-per-employee-each-year/>.

Mills, Patrick M., "Fuzzy Speech Recognition," submitted to the Department of Electrical and Computer Engineering, College of Engineering, University of South Carolina, 1996. URL: <http://www.nvrlnd.com/~mills/fuzzy/fuz_speech.pdf>.

U.S. Appl. No. 13/034,112, entitled "Advanced CAPTCHA Using Integrated Images," filed Feb. 24, 2011.

* cited by examiner

ADVANCED CAPTCHA USING IMAGES IN SEQUENCE

FIELD OF THE INVENTION

This disclosure relates generally to information security and more specifically to an advanced CAPTCHA program for allowing or denying access to a resource accessible to a computer.

BACKGROUND

A CAPTCHA (Completely Automated Public Turing Test to Tell Computers and Humans Apart) is a program that protects websites against automated programs (bots) by generating and grading tests that humans can pass, but current computer programs either cannot or have difficulty passing. For example, humans can read distorted text, but a computer program may not be able to. A CAPTCHA is sometimes referred to as a reverse Turing test, as it is the computer testing a human and not the other way around.

A CAPTCHA acts as a security mechanism by requiring a correct answer to a question, which only a human can answer any better than a random guess. Humans have speed limitations, and hence, cannot replicate the impact of an automated program. Thus the basic requirement of a CAPTCHA is that computer programs must be slower than humans in responding correctly. CAPTCHAs are useful for several applications, including, but not limited to: preventing comment spam in blogs, protecting website registration, protecting e-mail addresses from web scrapers, online polls, preventing dictionary attacks in password systems, and even preventing worms and spam in e-mail.

SUMMARY

Aspects of the present invention disclose a method, system, and program product for determining if a user of a computer system is a human or an automated program. A computer system receives an indication that a Completely Automated Public Turing test to Tell Computers and Humans Apart (CAPTCHA) is needed, and in response, the computer system selects a plurality of images that when placed in a specific order suggests a chronological sequence. The computer system presents the plurality of images to the user. The computer system receives, from the user, a suggested order of the plurality of images. The computer system determines if the suggested order for the plurality of images matches the specific order. In response to the suggested order matching the specific order, the computer system determines that the user is a human. In response to the suggested order not matching the specific order, the computer system determines that the user is an automated program.

DETAILED DESCRIPTION

The present invention will now be described in detail with reference to the figures.

Figure 1:
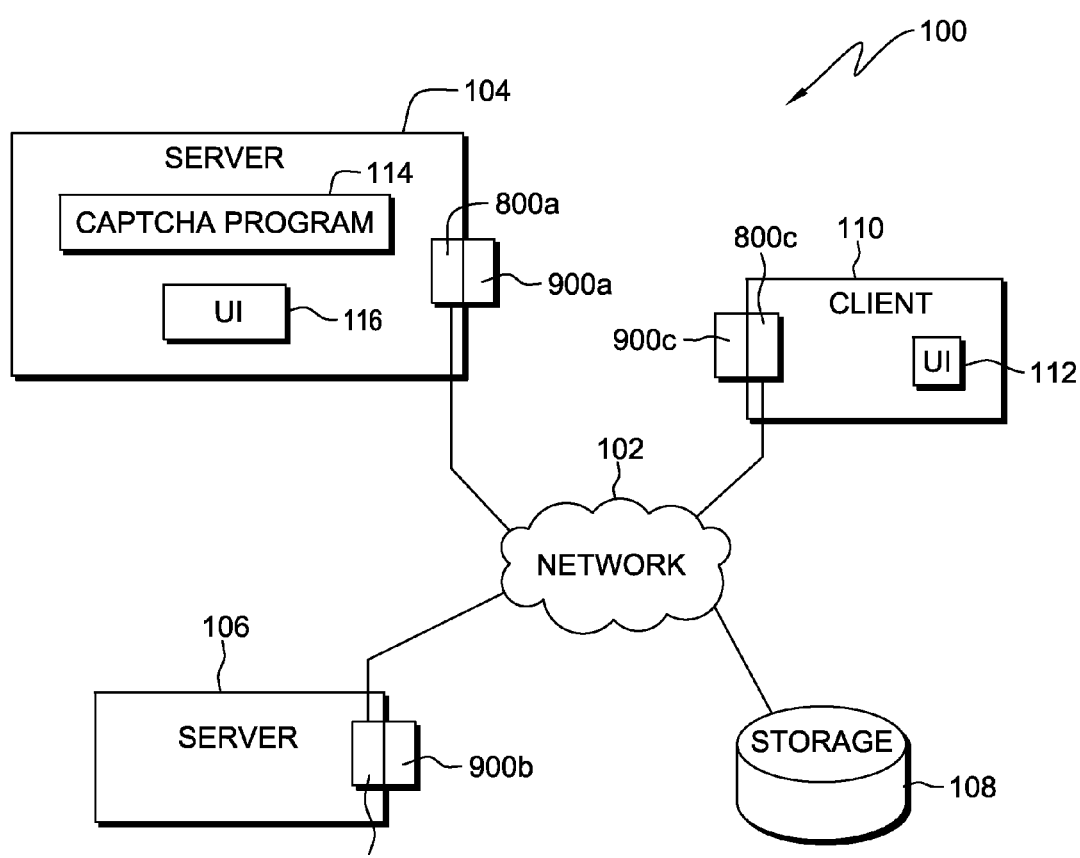
FIG. 1 depicts an illustrative diagram of a data processing environment as a network of data processing systems in which illustrative embodiments may be implemented.

FIG. 1 depicts a diagram of a data processing environment as a network of data processing systems in which embodiments may be implemented. It should be appreciated that FIG. 1 provides only an illustration of one implementation and does not imply any limitations with regard to the environments in which different embodiments may be implemented. Many modifications to the depicted environments may be made.

Network data processing system 100 comprises a network of computers in which an embodiment may be implemented. Network data processing system 100 contains network 102, which acts as a medium for providing communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. Server computers 104 and 106 may be, for example, a server computer system such as a management server, a web server, or any other electronic device or computing system capable of receiving and sending data. In another embodiment, server computer 104 may represent a server computing system utilizing multiple computers as a server system, such as in a cloud computing environment.

Server computer 104 contains user interface (UI) 116. UI 116 is a web UI (WUI). A WUI accepts input and provides output (such as selected image information) by generating web pages which are transmitted via the Internet (such as network 102) and viewed by the user (at client computer 110) using a web browser program.

Client computer 110 connects to network 102. Client computer 110 may be, for example, a client computer system such as a notebook, a laptop computer, a tablet computer, a handheld device or smart-phone, a thin client, or any other electronic device or computing system capable of communicating with a server computer system, such as server computers 104 and 106, through a network. In the depicted example, server computer 104 provides information, such as boot files, operating system images, and applications to client computer 110. Client computer 110 acts as a client to server computer 104 in this example. Client computer 110 may contain UI 112. Alternatively to UI 116 on server computer 104, UI 112 may process and display received and selected image information, as well as accepts data entry from a user. UI 112 may be, for example, a graphical user interface (GUI). Network data processing system 100 may include additional server computers, client computers, displays and other devices not shown.

CAPTCHA program 114 protects a computer resource, such as a database, application, or some other program by only allowing access if a user trying to access the protected resource is determined to be a human. CAPTCHA program 114 sends image information to client computer 110 and receives from client computer 110 input used to determine whether or not to allow access to the protected resource.

In one embodiment, CAPTCHA program 114 runs on server computer 104, as where CAPTCHA program 114 is a web-based program on a web server accessible to many clients attempting to access the protected resource. In one embodiment the protected resource also resides on server computer 104. In another embodiment, the protected resource may reside on server computer 106, and server computer 106 may in turn act as a relay between CAPTCHA program 114 on server computer 104 and client computer 110 to determine if access to the protected resource on server computer 106 should be granted to client computer 110.

Data gathered, generated, and maintained for use by CAPTCHA program 114 may be stored on server computer 104 or storage unit 108.

Server computers 104 and 106, and client computer 110, each maintain respective internal components 800a, 800b, and 800c, and respective external components 900a, 900b, and 900c.

In the depicted example, network data processing system 100 is the Internet with network 102 representing a worldwide collection of networks and gateways that use the Transmission Control Protocol/Internet Protocol suite of protocols to communicate with one another. Network data processing system 100 may also be implemented as a number of different types of networks, such as, for example, an intranet, a local area network (LAN), or a wide area network (WAN). FIG. 1 is intended as an example, and not as an architectural limitation for the different embodiments.

Figure 2:
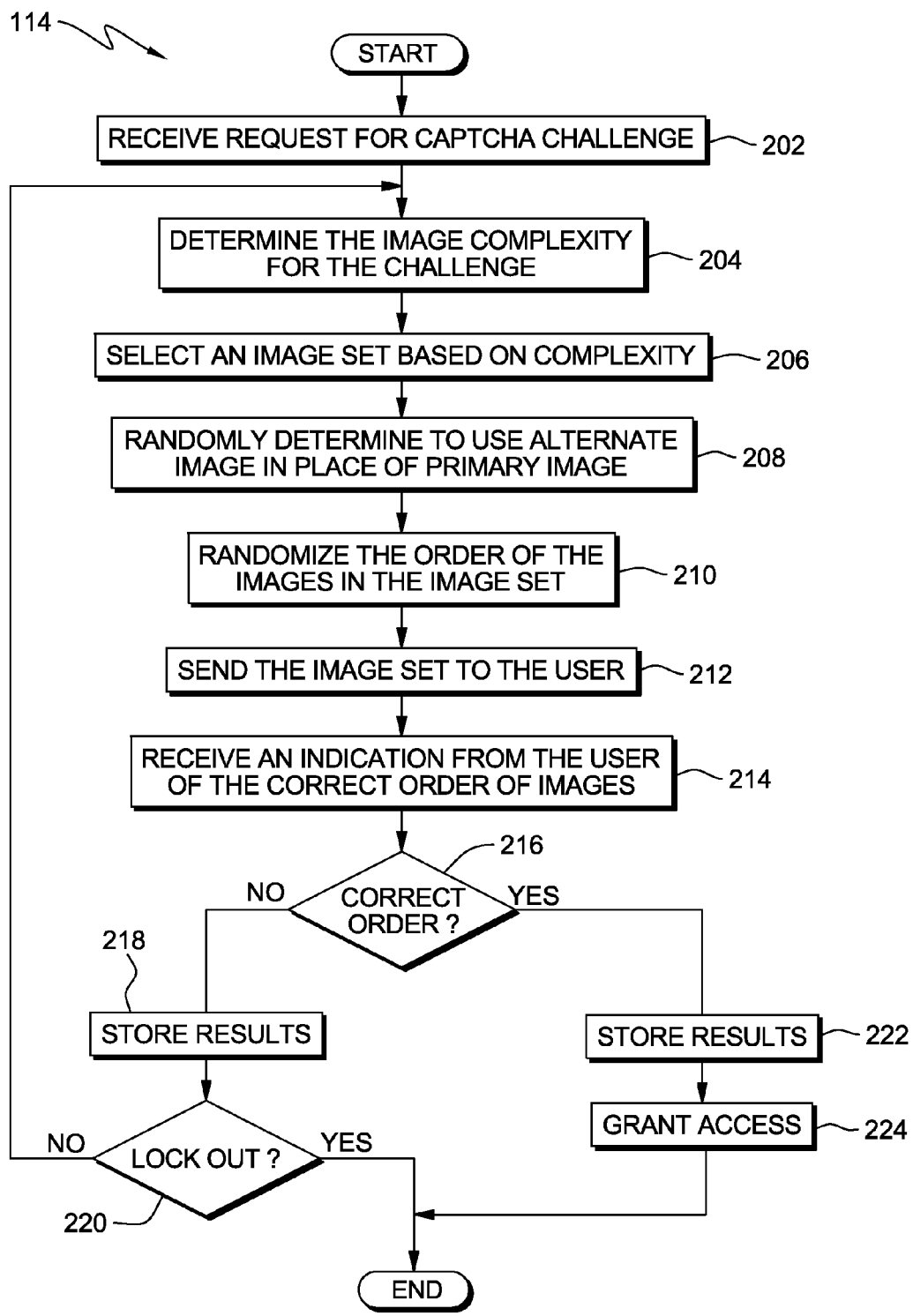
FIG. 2 depicts a flowchart of the steps of a CAPTCHA program for determining if a user of a computer system is a human or an automated program, in accordance with an illustrative embodiment.

FIG. 2 depicts a flowchart of the steps of CAPTCHA program 114 for determining if a user of a computer system is a human or an automated program, in accordance with an illustrative embodiment.

In step 202, CAPTCHA program 114 receives a request for a CAPTCHA challenge. In response to a user requesting some application or resource, the application or resource requests the initiation of the CAPTCHA to determine whether the user is a human or a bot and should be granted access to the resource or application.

In response to the challenge request, CAPTCHA program 114 determines the image complexity for the challenge (step 204). Image complexity refers to the difficulty that should be presented to a user in solving the challenge. For example, if CAPTCHA program 114 detects suspicious activity, CAPTCHA program 114 presents more difficult challenges. In one embodiment, suspicious activity may be determined by repeated failed attempts by a user. In another embodiment, suspicious activity may be determined if there are repeated attempts, successful or unsuccessful, from the same IP address. Other methods may be used to determine if a higher difficulty challenge is warranted.

CAPTCHA program 114 selects an image set based on the image complexity (step 206) determined in step 204. The basic principle is that the set of images relate to each other in some way and when organized correctly, suggest some chronological sequence. For example three images may show an egg, a baby chick, and rooster. Alternatively, the state of being of the same object may be the key. One image might show a dart in hand, a second image might show the dart in flight, and a third image might show the dart in a dart board. For either of these examples, a human would know what each of the images are, and would be able to put the images in the correct order. This task is difficult for an automated program. The automated program would first have to have some image recognition program to determine what each of the images represents, and then would have to somehow determine how the images interrelate. Randomly ordering the images successfully would also prove difficult for the automated program.

The probability of guessing the correct order can be drastically reduced by adding a minimal number of images. If the image set contains three images, the chance of an automated program guessing correctly is 1/3! (1/3*2) or a one out of six chance. Four images will reduce this to a one out of twenty-four chance (4!) and five images to a one out of one hundred twenty (5!). Though more images in a set may increase the difficulty for a human as well, unrelated images may be added which a human could quickly disregard, but an automated program would still have to spend resources analyzing. For example, in the egg, chick, and rooster example, additional images of an umbrella and a hula-hoop could be quickly disregarded by a human. The probability of an automated program guessing correctly here is one out of sixty (5!/2!).

As such, the image complexity determined may affect the number of related images, the number of unrelated images sent with the related images, a difficulty rating for type of images sent, etc. For example an "easy" ranked image complexity may indicate to CAPTCHA program 114 to select a set of three images. A "medium" complexity might suggest four or five related images or an added unrelated image. A "high" complexity might include four or five related images and one or two unrelated images. Additionally, the difficulty rating for the related images may be increased. For example, a "high" difficulty rating for the images might include a change in the frame of reference. Instead of having a male toddler, a male teenager riding a bike, and an adult male in a business suit, CAPTCHA program 114 might present a puppy (suggesting infancy), a teenage girl, and an adult male. A computer would have extra difficulty finding the interrelation (a state of age or growth or maturity in this example) of these images. Other combinations of numbers and types of pictures sent may be used.

CAPTCHA program 114 may locate images to use from a private image repository, a national library's image database, or randomly select the images from an Internet source. In another embodiment, images may be selected from a video sequence. Any number of images may be captured from the frames of the video. For example, in a car chase sequence there may be multiple frames showing the car in park, multiple frames showing the car in motion, and multiple frames showing the car stopped by police, crashed, etc.

After selecting the image set, CAPTCHA program 114 may determine to use one or more alternate images (step 208) for the object (or state of being of the object) represented in the image set. In the preferred embodiment, for each image of an image set, there is a database of alternate images representing the same object in the image. For example, there may be a "baby chick" database comprising hundreds of different images of baby chicks. When an image set is selected containing a baby chick, CAPTCHA program 114 randomly selects one of the images from the database. This functionality decreases the likelihood that an automated program has a saved database of images that have been figured out.

CAPTCHA program 114 randomizes the order of the images in the image set (step 210), and presents the image set to the user (step 212). In another embodiment, CAPTCHA program 114 randomly selects an image of the image set and sends it to the user, and repeats until all images have been sent.

In other embodiments, the order in which images are sent may be determined in another manner.

CAPTCHA program 114 receives an indication from the user of the correct order of the images (step 214). This indication may be referred to as a suggested order. Various methods exist for receiving the user suggested order. In one embodiment, a user selects the images (e.g., by clicking on them with a mouse) in the proper order and CAPTCHA program 114 receives the coordinates of each selection. In a second embodiment the user selects the image and then selects a corresponding space indicative of the placement of the image. In this embodiment the images may be selected in any order so long as the correct corresponding space is also selected. In a third embodiment, each of the images may be moved as a whole and dragged and dropped into the correct sequence by a user.

Additionally, in one embodiment, a user might indicate that the user has trouble making out the image (i.e., a visually impaired individual). In response, CAPTCHA program 114 sends an audio clip corresponding to the image to the user to assist the user in suggesting an order.

CAPTCHA program 114 determines if the suggested order matches the correct order for the images (decision block 216). If the suggested order is incorrect, results may be stored (step 218) for subsequent metrics. Metrics might include numbers like the fail rates for a specific image set and/or how many times a particular image has been a member of a failing set. If a particular image fails too often, the image may be pulled from the database.

After storing the results, CAPTCHA program 114 determines if it should lock the user out (decision block 220). For example, CAPTCHA program 114 might decide that if a user fails the test three times in a row, that the user is an automated program that should be prevented from continuing to attempt the CAPTCHA challenge for access to whatever resources are being protected. If CAPTCHA program 114 determines to lock the user out, the program ends. In another embodiment, CAPTCHA program 114 may be devoid of decision block 220.

If CAPTCHA program 114 determines not to lock out the user, CAPTCHA program 114 returns to step 204 to determine the image complexity for the next challenge. In a preferred embodiment, the fact that the user just failed a challenge is taken into account and the complexity changes accordingly.

The preferred embodiment does not use the same image set after a fail.

If, on the other hand, CAPTCHA program 114 determines that the suggested order is the correct order, CAPTCHA program 114 stores the positive results (step 222). Due to the correct response, CAPTCHA program 114 assumes that the user is a human and grants the user access (step 224) to whatever resource the challenge is protecting.

Figure 3:
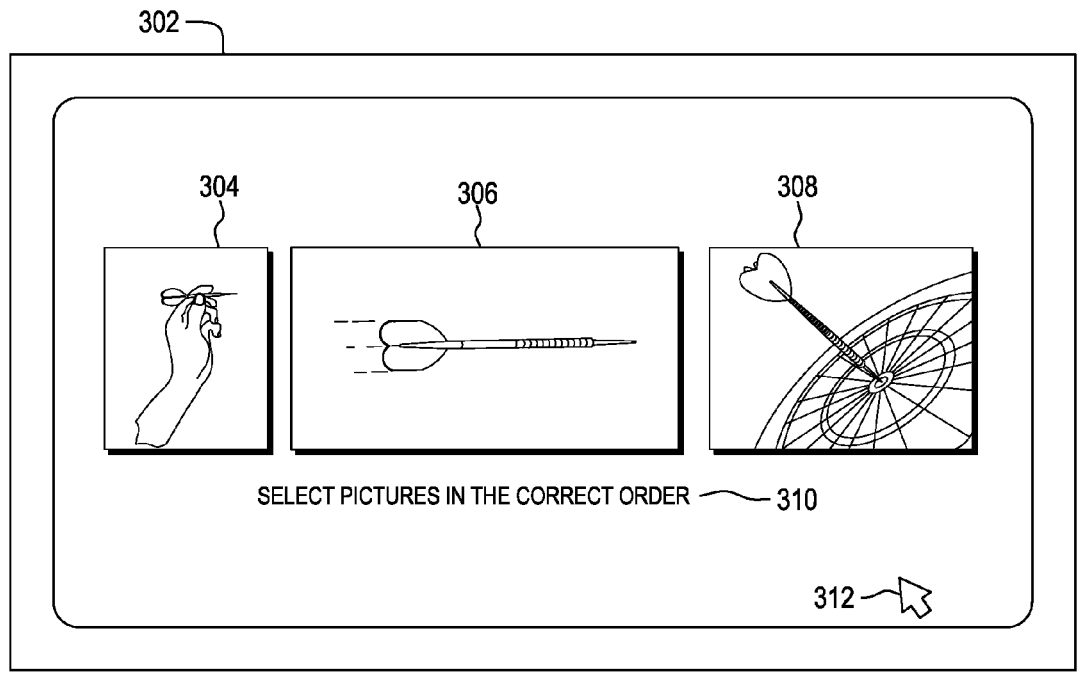
FIG. 3 is an exemplary user interface for indicating an order for a set of related images.

FIG. 3 is an exemplary user interface for indicating an order for a set of related images. User interface 302 displays images 304, 306, and 308 to a user. Images 304, 306, and 308 represent different states of being for an object, in this case a dart. 304 shows a dart in hand, 306 shows a dart in flight, and 308 shows a dart in a dart board. In this particular instance, images 304, 306, and 308 happen to be in the correct sequence. The order is preferably randomized, so this display is a valid possibility. Any other order is also acceptable. Instructions 310 instruct the user how to proceed. In user interface 302, images 304, 306, and 308 should be selected by mouse pointer 312 in the proper order.

Figure 4:
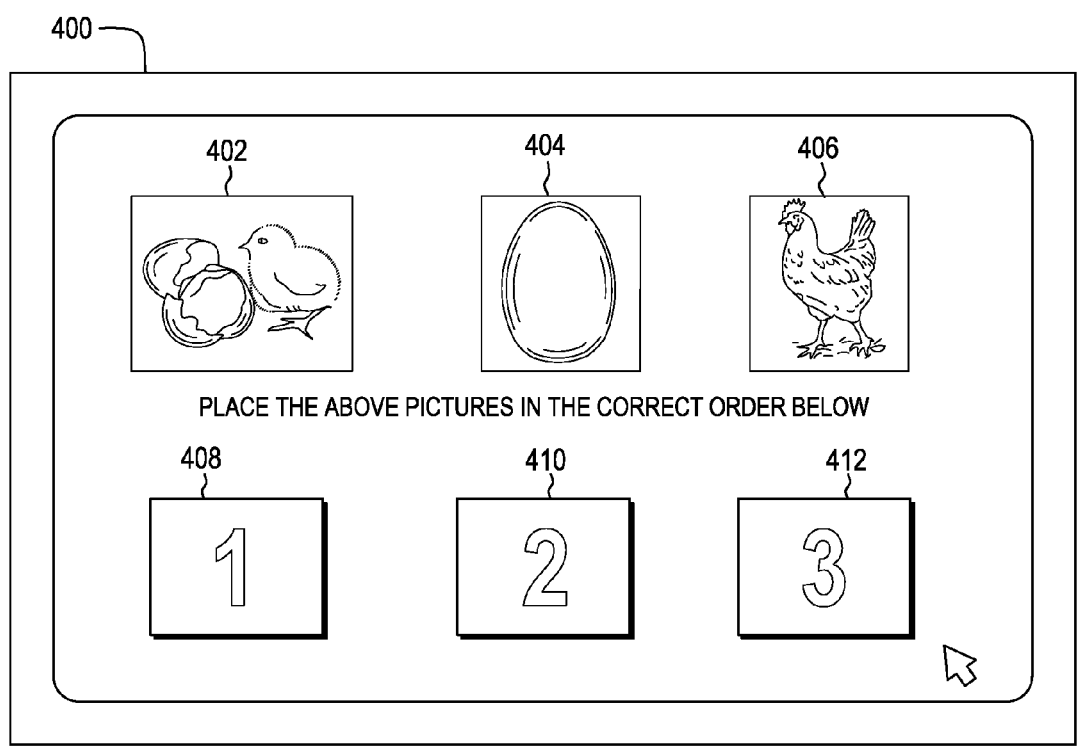
FIG. 4 is an exemplary user interface for placing related images in the correct order.

FIG. 4 is an exemplary user interface for placing related images in the correct order. User interface 400 displays images 402 (a baby chick), 404 (an egg), and 406 (a rooster). Placement blocks 408, 410, and 412 are displayed beneath the images. Images 402, 404, and 406 should be moved into the corresponding placement block. For example, image 404 of the egg should be placed in placement block 408 showing the number '1'. This may be done by dragging and dropping image 404, or alternatively, by clicking an image and a corresponding placement block.

Figure 5:
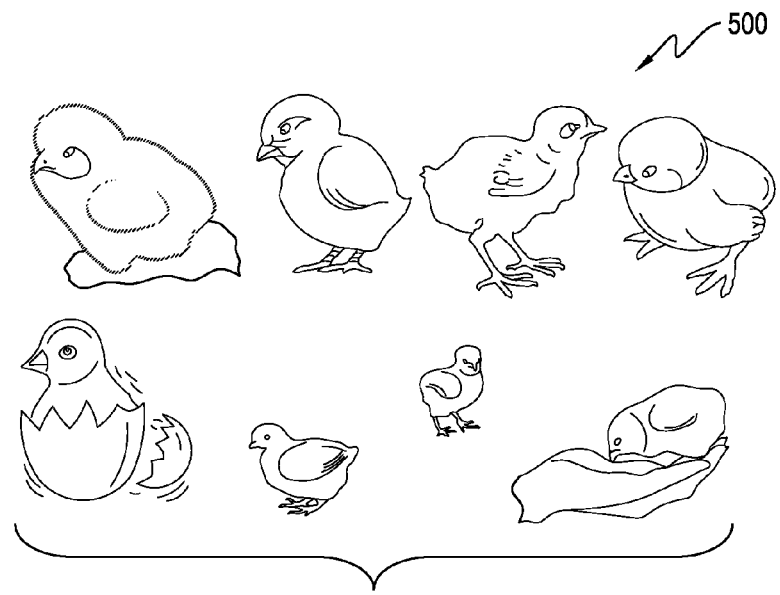
FIG. 5 illustrates a database of images representing the same object in accordance with an embodiment of the present invention.

FIG. 5 illustrates a database of images representing the same object in accordance with an embodiment of the present invention. Database 500 contains a multitude of separate images for a "baby chick." Whenever a baby chick is one image of an image set, any of the images corresponding to baby chicks may be selected for display to the user.

Figure 6:
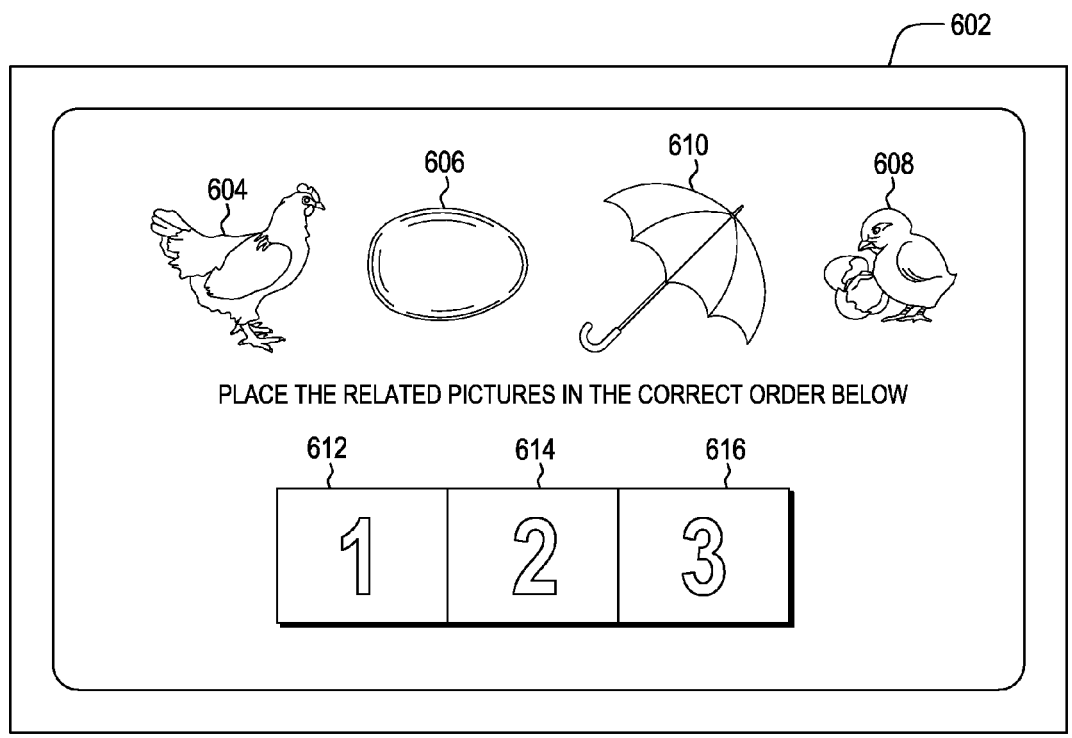
FIG. 6 is an exemplary user interface for placing related images in the correct order out of a set of images that include unrelated images.

FIG. 6 is an exemplary user interface for placing related images in the correct order out of a set of images that include unrelated images. User interface 602 displays images 604, 606, 608, and 610 along with placement blocks 612, 614, and 616. Image 604 is a rooster and corresponds to the third placement block 616. Image 606 is an egg and corresponds to the first placement block 612. Image 608 is a chick and corresponds to the second placement block 614. Finally, image 610 is an umbrella, representing an image that is unrelated to the rest of the images. Image 610 is displayed to force an automated program to analyze and process another image and to make it more difficult for the automated program to choose the correct images and how they interrelate.

Figure 7:
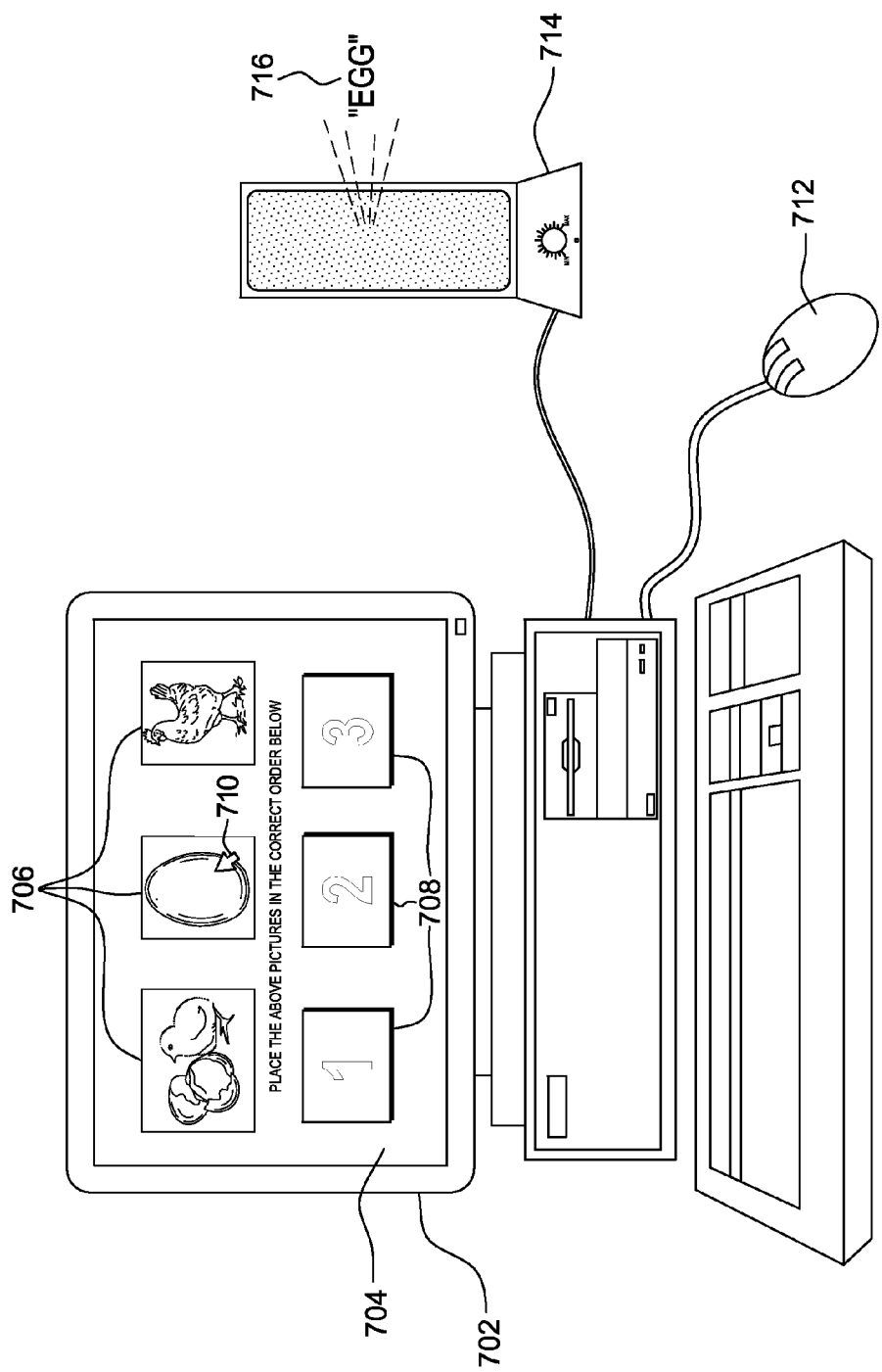
FIG. 7 is a user interface that allows the use of related audio clips for the visually impaired in accordance with an embodiment of the present invention.

FIG. 7 is a user interface that allows the use of related audio clips for the visually impaired in accordance with an embodiment of the present invention. System 702 is an exemplary computer accessing the CAPTCHA challenge. System 702 may be, for example, client computer system 110 from FIG. 1.

A user interface 704 runs on system 702 and displays images 706 and placement blocks 708. Each of images 706 may be dragged to the correct placement block from placement blocks 708 using pointer 710 controlled by mouse 712.

In response to some indication, for example, by hovering pointer 710 over an image, an audio clip corresponding to the image is played over speaker 714. For example, if pointer 710 rests on the image of an egg, audio clip 716 may play the word "egg." Alternatively, the sound may relate to the image without verbally giving the name of the images. If pointer 710 hovers over an image of a baby chick, audio clip 716 might instead make a chirping noise of baby chickens. A human would understand that the image related to the chirping would come subsequent to the word "egg," and before a rooster's crowing.

Figure 8:
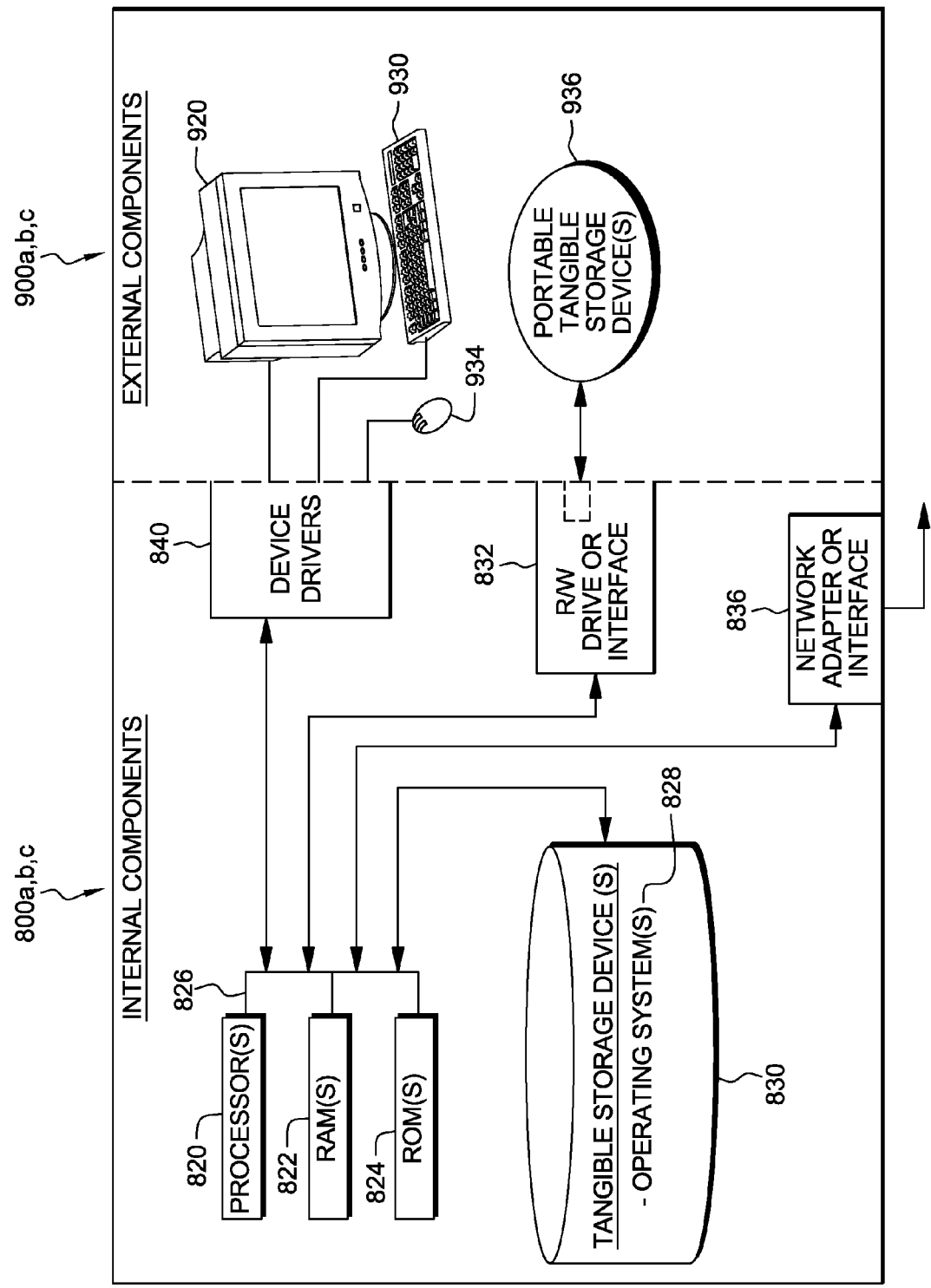
FIG. 8 depicts a block diagram of internal and external components of a data processing system depicted in accordance with an illustrative embodiment.

FIG. 8 depicts a block diagram of internal and external components of a data processing system depicted in accordance with an illustrative embodiment.

Server computers 104 and 106, and client computer 110, include respective sets of internal components 800a,b,c and external components 900a,b,c, illustrated in FIG. 8. Each of the sets of internal components 800a,b,c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and CAPTCHA program 114 (for server computer 104), and any other programs for server computer 104, server computer 106, and client computer 110 are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b,c also includes a R/W drive or interface 832 to read from and write to one or more portable computer-readable tangible storage devices 936 such as a CD-ROM, DVD, memory stick, magnetic tape, magnetic disk, optical disk or semiconductor storage device. CAPTCHA program 114 (for server computer 104), and any other programs for server computer 104, server computer 106, and client computer 110 can be stored on one or more of the respective portable computer-readable tangible storage devices 936, read via the respective R/W drive or interface 832 and loaded into the respective hard drive 830.

Each set of internal components 800a,b,c also includes a network adapter or interface 836 such as a TCP/IP adapter card. CAPTCHA program 114 (for server computer 104), and any other programs for server computer 104, server computer 106, and client computer 110 can be downloaded to the respective computers from an external computer via a network (such as network 102) and network adapter or interface 836. From the network adapter or interface 836, CAPTCHA program 114 (for server computer 104), and any other programs for server computer 104, server computer 106, and client computer 110 are loaded into the respective hard drive 830. The network may comprise copper wires, optical fibers, wireless transmission, routers, firewalls, switches, gateway computers and/or edge servers.

Each of the sets of external components 900a,b,c includes a computer display monitor 920, a keyboard 930, and a computer mouse 934. Each of the sets of internal components 800a,b,c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824). Additionally, external components 900a,b,c may include audio speakers.

CAPTCHA program 114 (for server computer 104), and any other programs for server computer 104, server computer 106, and client computer 110 can be written in various programming languages (such as Java, C++) including low-level, high-level, object-oriented or non object-oriented languages. Alternatively, the functions of CAPTCHA program 114 (for server computer 104), and any other programs for server computer 104, server computer 106, and client computer 110 can be implemented in whole or in part by computer circuits and other hardware (not shown).

Based on the foregoing, a computer system, method and program product have been disclosed for determining if a user of a client computer system is a human or a computer program. However, numerous modifications and substitutions can be made without deviating from the scope of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. Therefore, the present invention has been disclosed by way of example and not limitation.

What is claimed is:

1. A method for determining whether to allow access to a computer resource, the method comprising the steps of:
   a computer system receiving an indication to execute a Completely Automated Public Turing Test to Tell Computers and Humans Apart (CAPTCHA), and in response, the computer system selecting a first plurality of still images that when placed in a specific order suggest a first chronological sequence having chronological gaps such that when viewed in sequence do not depict motion from one image to the next;
   the computer system presenting the first plurality of still images to a user;
   the computer system receiving, from the user, a suggested order of the first plurality of still images;
   the computer system determining that the suggested order for the first plurality of still images matches the specific order, and in response, the computer system granting the user access to a computer resource;
   the computer system selecting a second plurality of still images that when placed in another specific order suggest a second chronological sequence having chronological gaps such that when viewed in sequence do not depict motion from one image to the next;
   the computer system presenting the second plurality of still images to a second user;
   the computer system receiving, from the second user, a suggested order for the second plurality of still images;
   the computer system determining that the suggested order for the second plurality of still images does not match the other specific order, and in response, the computer system increasing a level of complexity for the CAPTCHA, with regard to the second user, and selecting a new plurality of still images for the second user based on the increased level of complexity; and
   the computer system determining whether a particular image from the second plurality of still images has been a member of a failing set of images a threshold number of times, and if so, removing the particular image from a collection of images from which still images are selected.

2. The method of claim 1, further comprising, prior to selecting the first plurality of still images that when placed in the specific order suggest a chronological sequence, the computer system determining a level of complexity for the first plurality of still images based on an amount of times the first user has attempted, successfully or unsuccessfully, the CAPTCHA in a given period of time.

3. The method of claim 1, further comprising the steps of:
   based on the increased level of complexity, the computer system determining a number of images, chronologically unrelated to the new plurality of still images, to present with the new plurality of still images; and
   the computer system presenting the number of chronologically unrelated images to the second user, along with the new plurality of still images.

4. The method of claim 1, wherein selecting the new plurality of still images based on the increased level of complexity comprises:
   the computer system determining one or more of: an increased number of images to be included in the new plurality of images, an increased difficulty rating for ordering the new plurality of images in the specific order, and an increased number of unrelated images to be sent to the second user.

5. The method of claim 1, wherein each image of the first plurality of still images is selected from a group of images representing a similar object or similar state of being of an object.

6. The method of claim 1, further comprising the steps of:
the computer system associating each still image of the first plurality of still images with an audio clip corresponding to an object or state of being for the object in the image; and
the computer system receiving a selection, from the first user, of one image from the first plurality of images, and in response, the computer system presenting the audio clip associated with the one image to the first user.

7. A computer program product comprising one or more computer-readable tangible storage devices and computer-readable program instructions which are stored on the one or more storage devices and when executed by one or more processors of the computer system of claim 1 perform the method of claim 1.

8. A computer system comprising one or more processors, one or more computer-readable memories, one or more computer-readable, tangible storage devices and program instructions which are stored on the one or more storage devices for execution by the one or more processors via the one or more memories and when executed by the one or more processors perform the method of claim 1.

9. A computer program product for determining whether to allow access to a computing resource, the computer program product comprising:
one or more computer-readable tangible storage devices and program instructions stored on at least one of the one or more storage devices, the program instructions comprising:
program instructions to receive an indication to execute a completely automated public Turing test to tell computers and humans apart (CAPTCHA), and in response, select a plurality of still images that when placed in a specific order suggest a chronological sequence having chronological gaps such that when viewed in sequence do not depict motion from one image to the next;
program instructions to send the plurality of still images to a client computer system for display;
program instructions to receive, from the client computer system, a suggested order of the plurality of still images;
program instructions to determine if the suggested order for the plurality of still images matches the specific order;
program instructions to, in response to a determination that the suggested order matches the specific order, grant the client computer system access to a computer resource;
program instructions to, in response to a determination that the suggested order does not match the specific order, determine a number of failed attempts by the client computer system, and if the number of failed attempts has reached a threshold level, increase a level of complexity for the CAPTCHA with respect to the client computer system; and
program instructions to, in response to a determination that a particular image from the plurality of still images has been a member of a failing set of images a threshold number of times, remove the particular image from a collection of images from which still images are selected.

10. The computer program product of claim 9, wherein the program instructions to increase the level of complexity for the CAPTCHA with respect to the client computer system comprise:
program instructions to select one or more still images chronologically unrelated to a new plurality of still images; and
program instructions to send the one or more chronologically unrelated still images to the client computer system for display with the new plurality of still images.

11. The computer program product of claim 9, further comprising program instructions, stored on at least one of the one or more storage devices, to determine, based on an increase in the level of complexity, one or more of: a number of still images to be included in a new plurality of still images, a difficulty rating for ordering the new plurality of still images in a specific order, and a number of unrelated images to be sent to the client computer system.

12. The computer program product of claim 9, wherein each image of the plurality of still images is selected from a group of images representing a similar object or similar state of being of an object.

13. The computer program product of claim 9, further comprising program instructions, stored on at least one of the one or more storage devices, to:
associate each image of the plurality of still images with an audio clip corresponding to an object or state of being for the object in the image; and
receive a selection, from the client computer system, of one image from the plurality of still images, and in response, send the audio clip associated with the one image to the client computer system.

14. A computer system for determining whether to allow access to a computing resource, the computer system comprising:
one or more processors, one or more computer-readable memories, one or more computer-readable tangible storage devices and program instructions which are stored on the one or more storage devices for execution by the one or more processors via the one or more memories, the program instructions comprising:
program instructions to receive an indication to execute a completely automated public Turing test to tell computers and humans apart (CAPTCHA), and in response, select a plurality of still images that when placed in a specific order suggest a chronological sequence having chronological gaps such that when viewed in sequence do not depict motion from one image to the next;
program instructions to send the plurality of still images to a client computer system for display;
program instructions to receive, from the client computer system, a suggested order of the plurality of still images;
program instructions to determine if the suggested order for the plurality of still images matches the specific order;
program instructions to, in response to a determination that the suggested order matches the specific order, grant the client computer system access to a computer resource;
program instructions to, in response to a determination that the suggested order does not match the specific order, determine a number of failed attempts by the client computer system, and if the number of failed attempts has reached a threshold level, increase a level of complexity for the CAPTCHA with respect to the client computer system; and
program instructions to, in response to a determination that a particular image from the plurality of still images has been a member of a failing set of images a threshold number of times, remove the particular image from a collection of images from which still images are selected.

15. The computer system of claim 14, wherein the program instructions to increase the level of complexity for the CAPTCHA with respect to the client computer system comprise:
- program instructions to select one or more still images chronologically unrelated to a new plurality of still images; and
- program instructions to send the one or more chronologically unrelated still images to the client computer system for display with the new plurality of still images.

16. The computer system of claim 14, further comprising program instructions, stored on at least one of the one or more storage devices for execution by at least one of the one or more processors via at least one of the one or more memories, to determine, based on an increase in the level of complexity, one or more of: a number of still images to be included in a new plurality of still images, a difficulty rating for ordering the new plurality of still images in a specific order, and a number of unrelated images to be sent to the client computer system.

17. The computer system of claim 14, wherein each image of the plurality of still images is selected from a group of images representing a similar object or similar state of being of an object.

18. The computer system of claim 14, further comprising program instructions, stored on at least one of the one or more storage devices for execution by at least one of the one or more processors via at least one of the one or more memories, to:
- associate each image of the plurality of still images with an audio clip corresponding to an object or state of being for the object in the image; and
- receive a selection, from the client computer system, of one image from the plurality of still images, and in response, send the audio clip associated with the one image to the client computer system.

* * * * *